(12) United States Patent
Silverbrook et al.

(10) Patent No.: US 6,290,349 B1
(45) Date of Patent: Sep. 18, 2001

(54) PRINTER CONSUMABLE CARTRIDGE

(75) Inventors: Kia Silverbrook, Balmain; Tobin Allen King, Cremorne; Paul Lapstun, Rodd Point, all of (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/575,178

(22) Filed: May 23, 2000

(30) Foreign Application Priority Data

May 25, 1999 (AU) .................................................. PQ0559
Jun. 30, 1999 (AU) .................................................. PQ1313

(51) Int. Cl.⁷ .................................................. B41J 2/175
(52) U.S. Cl. .................................................. 347/87; 347/86
(58) Field of Search .................................. 347/85, 86, 87; 402/79

(56) References Cited

U.S. PATENT DOCUMENTS

| 4,571,599 | 2/1986 | Rezanka | 347/86 |
| 6,048,055 * | 4/2000 | Hakkaku | 347/86 |
| 6,099,189 * | 8/2000 | Owen et al. | 402/79 |

FOREIGN PATENT DOCUMENTS 4128101   2/1993   (DE) .

* cited by examiner

*Primary Examiner*—N. Le
*Assistant Examiner*—Anh T. N. Vo

(57) ABSTRACT

A replaceable cartridge for supplying consumable material to an ink jet printer, the printer having a printhead assembly; air pump to provide air to the printhead assembly; and binding material adapted to bind printed pages into a bound document, wherein, the replaceable cartridge includes an air filter unit, such that in use the air provided to the printhead assembly is filtered by the air filter unit; and a storage chamber containing binding material suitable to bind the printed pages into the bound document.

8 Claims, 10 Drawing Sheets

FIG. 6A-B

PRINTER CONSUMABLE CARTRIDGE

CO-PENDING APPLICATIONS

Various methods, systems and apparatus relating to the present invention are disclosed in the following co-pending applications filed by the applicant or assignee of the present invention simultaneously with the present application Ser. Nos.: 09/575,197 09/575,195, 09/575,159, 09/575,132, 09/575,123, 09/575,148, 09/575,130, 09/575,165, 09/575,153, 09/575,118, 09/575,131, 09/575,116, 09/575,144, 09/575,139, 09/575,186, 09/575,185, 09/575,191, 09/575,145, 09/575,192, 09/575,181, 09/575,193, 09/575,156, 09/575,183, 09/575,160, 09/575,150, 09/575,169, 09/575,184, 09/575,128, 09/575,180, 09/575,149, 09/575,179, 09/575,133, 09/575,143, 09/575,187, 09/575,155, 09/575,196, 09/575,198, 09/575,178, 09/575,164, 09/575,146, 09/575,174, 09/575,163, 09/575,168, 09/575,154, 09/575,129, 09/575,124, 09/575,188, 09/575,189, 09/575,162, 09/575,172, 09/575,170, 09/575,171, 09/575,161, 09/575,141, 09/575,125, 09/575,142, 09/575,140, 091575,190, 09/575,138, 09/575,126, 09/575,127, 09/575,158, 09/575,117, 09/575,147, 09/575,152, 09/575,176, 09/575,115, 09/575,114, 09/575,113, 09/575,112, 09/575,111, 09/575,108, 09/575,109.

The disclosures of these co-pending applications are incorporated herein by cross-reference.

FIELD OF THE INVENTION

The present invention relates to ink jet printers and in particular, consumable cartridges for ink jet printers.

BACKGROUND OF THE INVENTION

Ink jet printers are widely used for printed document production. Ink jet printheads eject droplets of ink or other colorant onto a media substrate to form the printed text or image. As the droplet size affects the resolution of the print, there is a need to keep the ejected ink drops small which in turn requires that the ejection nozzles in the printhead be correspondingly small.

To prevent particulate contaminants from clogging the nozzles, some ink jet printers are designed such that positive air pressure is provided within the printheads. The air supplied to the printheads to create the positive pressure should be filtered to guard against clogging from within by airborne particles. Ais with all filters, the air filter must be periodically cleaned or replaced. Some businesses may have this done as part of a maintenance regime; however, often it is neglected until the printers' operation is compromised. It will be appreciated that printers used at home are even less likely to receive regular maintenance.

For this reason, it is expected that printers used in the Applicant's netpage system would ordinarily be susceptible to this problem. A detailed overview of the netpage system is provided below. Netpage printers are an important part of this system and a description of these is also set out below. These printers produce magazine quality printing in the form of bound documents. Because of the high-resolution printing, they have comparatively small ink nozzles formed using microelectromechanical techniques, which can easily clog from microscopic airborne contaminants. Furthermore, common forms of the printer, such as the wallprinter, are intended solely for use in a domestic environment where there is unlikely to be any regular maintenance regime in place.

SUMMARY OF THE INVENTION

It is an object of the present invention to overcome or ameliorate the above problems associated with ink jet printers. Accordingly, the present invention provides A replaceable cartridge for supplying consumable material to an ink jet printer, the printer having:

a printhead;

means provide air to the print head; and, binding means adapted to bind printed pages into a bound document; wherein, the replaceable cartridge includes:

an air filter unit, such that in use the air provided to the printhead is filtered by the air filter unit; and a storage chamber for binding material suitable for use in the binding means.

Preferably, the air filter unit is capable of removing microscopic particles from the air provided to the printhead. In a further preferred form, the means to provide air to the printhead includes an air pump and conduit system for fluid communication with the printhead; wherein, the filter unit is adapted to detachably interface with the conduit system to filter airflow to the printhead. In a particularly preferred form, the cartridge is adapted to supply the printer with;

cyan, magenta, yellow and/or black ink.

In other preferred forms, the cartridge is also adapted to supply infrared ink and/or fixative.

As discussed above, the present invention will be described with reference to the netpage system developed by the Applicant and in particular, the netpage wallprinter developed specifically for use within this system. However, it will be appreciated that the invention may be embodied in many other forms.

DETAILED DESCRIPTION OF PREFERRED AND OTHER EMBODIMENTS

Figure 1:
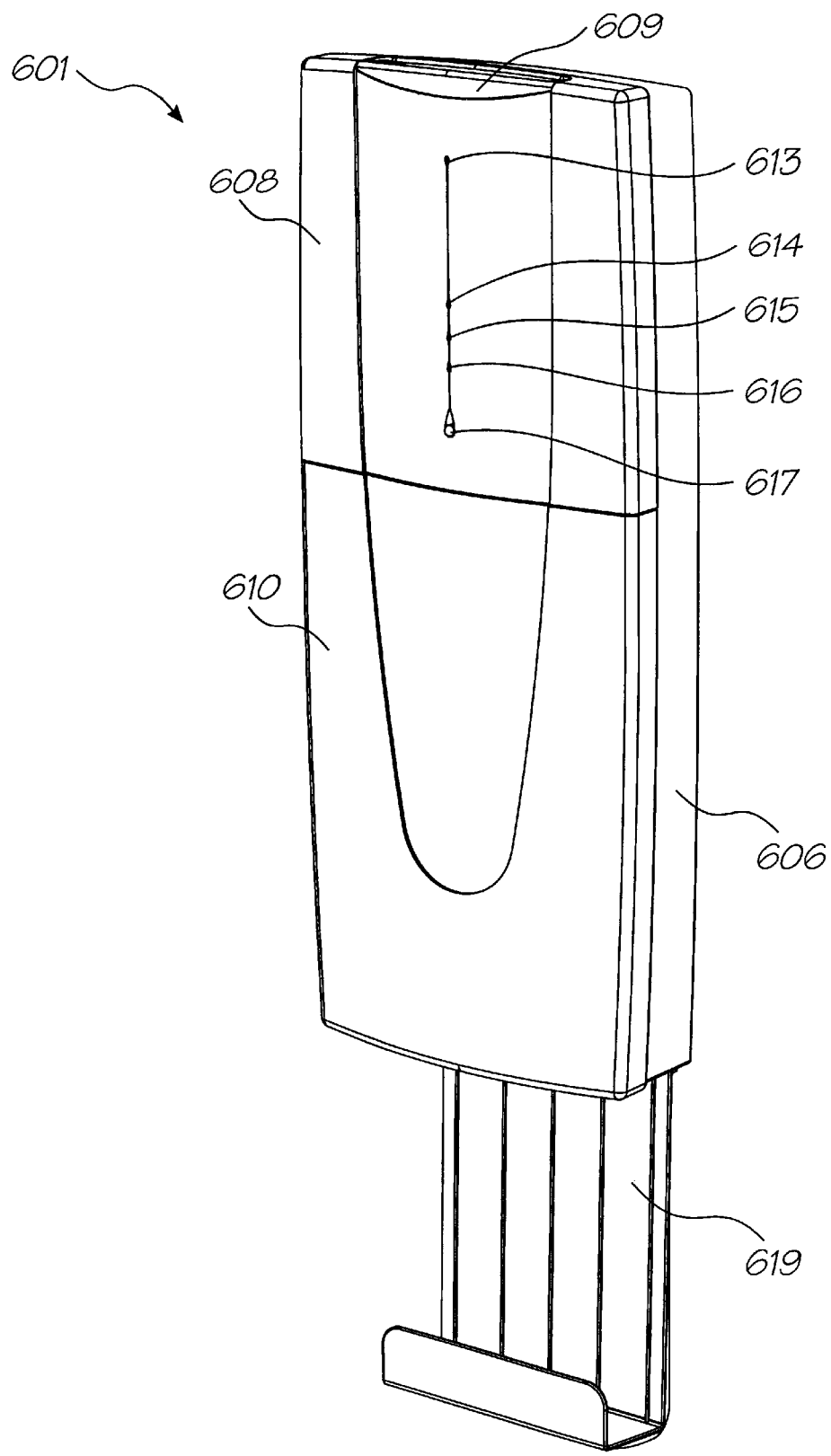
FIG. 1 shows a front three-quarter view of the wallprinter.

Note: Memjet™ is a trade marks of Silverbrook Research Pty Ltd, Australia.

In the preferred embodiment, the invention is configured to work with the netpage system, an overview of which follows. The system is described in this specification to reduce the need for external reference when attempting to understand the context in which the preferred embodiments and aspects of the present invention operate.

In its preferred form, the netpage system relies on the production of, and human interaction with, netpages. These are pages of text, graphics and images printed on ordinary paper, but which work like interactive Web pages. Information is encoded on each page using ink, which is substantially invisible to the unaided human eye. The ink, however, and thereby the encoded information, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized via the pen, allowing forms to be filled in. In other embodiments, signatures recorded on a netpage are automatically verified, allowing e-commerce transactions to be securely authorized.

The netpage pen works in conjunction with a netpage printer, an Internet-connected printing appliance for home, office or mobile use. The pen is wireless and communicates securely with the netpage printer via a short-range radio link.

The netpage printer delivers, periodically or on demand, personalized newspapers, magazines, catalogues, brochures and other publications, all printed at high quality as interactive netpages. Unlike a personal computer, the netpage printer is an appliance which can be, for example, wall-mounted adjacent an area where the morning news is first consumed, such as in a user's kitchen, near a breakfast table, or at the household's point of departure for the day. It also comes in tabletop, desktop, portable and miniature versions.

Netpages printed at their point of consumption combine the ease-of-use of paper with the timeliness and interactivity of an interactive medium.

The netpage system is made considerably more convenient because of the functional superiority of the netpage printers. At the heart of these printers are highspeed microelectromechanical system (MEMS) based inkjet (Memjet™) printheads, as disclosed in various co-pending and co-filed applications from the list above. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

A netpage printer prints pages of photographic-quality images and magazine quality text at a rate of over 30 double sided sheets per minute (that is, more than 60 pages per minute). They come in a variety of forms, including wall-mounted versions, tabletop versions, portable versions, and pocket versions. Given the nature of the netpage system, it is envisaged that one of the most commercially relevant forms of netpage printer will be the wall mounted version referred to as wallprinter. For convenience, the present invention will be described in detail with reference to this specific version shown in the accompanying drawings.

Figure 2:
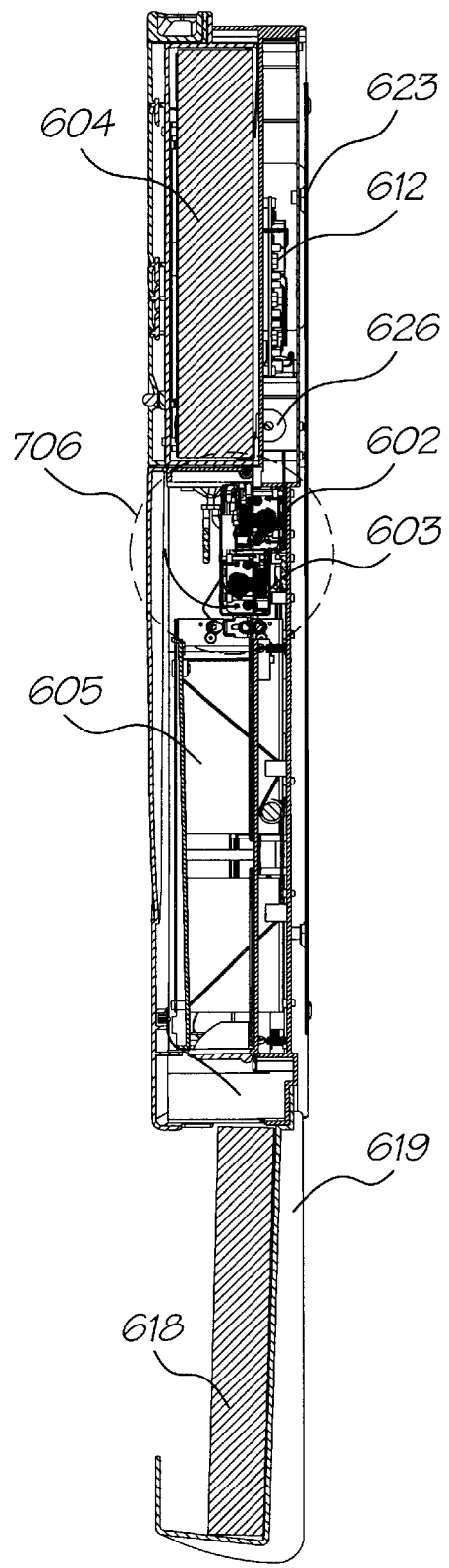
FIG. 2 shows a section through the length of the wallprinter.

The vertically-mounted netpage wallprinter 601 is shown fully assembled in FIG. 1. As best shown in FIG. 2, it prints netpages on Letter/A4 sized media using duplexed 8½" Memjet™ print engines 602 and 603. It uses a straight paper path with the paper 604 passing through duplexed print engines 602 and 603 which print both sides of a sheet simultaneously, in full color and with fill bleed. wallprinter provides the print engines in staggered configuration, however, in other printers and configurations they are mutually opposed. A multi-DSP raster image processor (RIP) rasterizes pages to internal memory, and a pair of custom print engine controllers expand, dither and print page images to the duplexed printheads in real time.

An integral binding assembly 605 applies a strip of glue along the front of one edge of each printed sheet, adhering it to the previous sheet when pressed against it. This creates a final bound document which can range in thickness from one sheet to several hundred sheets.

Printed, bound documents 618 exit through the base of the wallprinter 601 into a clear, plastic, removable collection tray 619.

Figure 5:
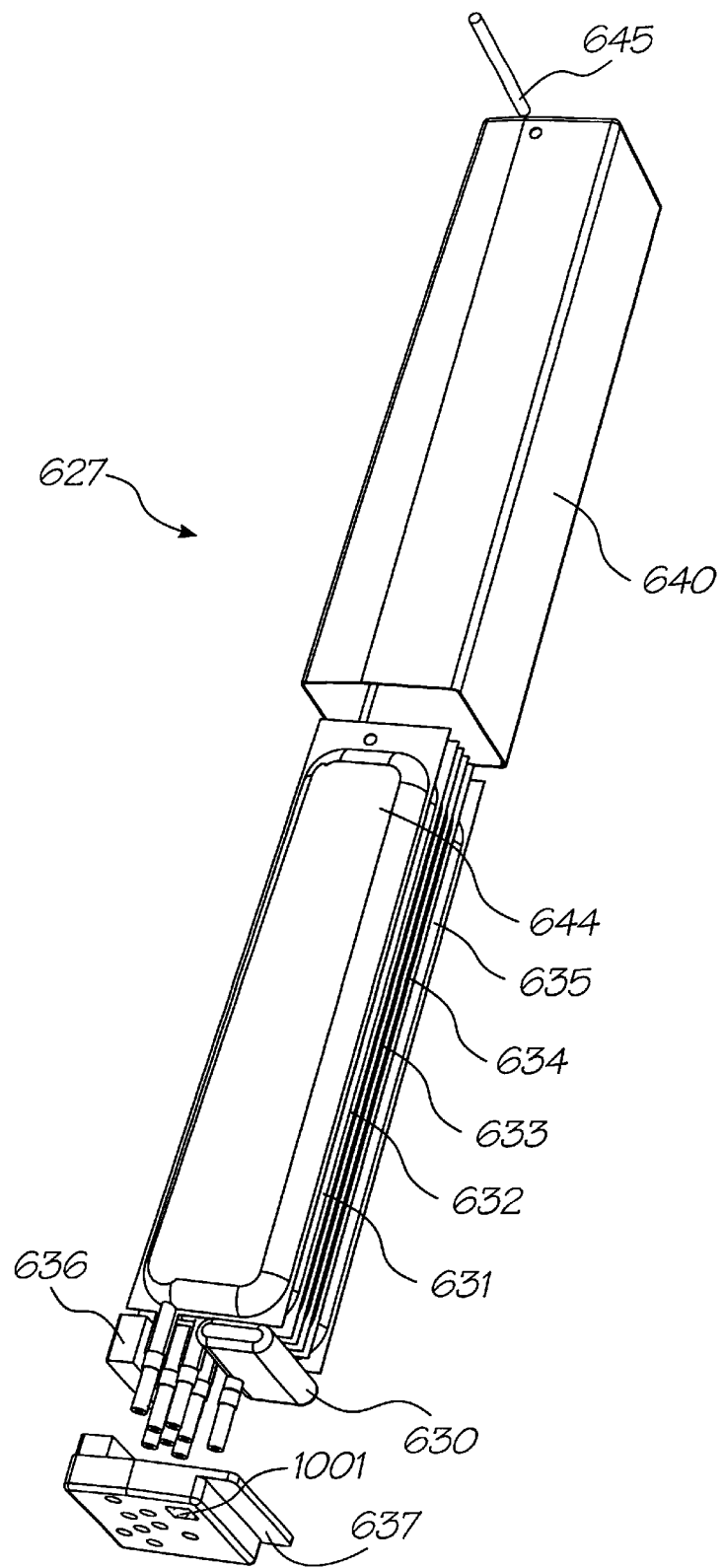
FIG. 5 shows an exploded view of the ink cartridge.
Figure 6:
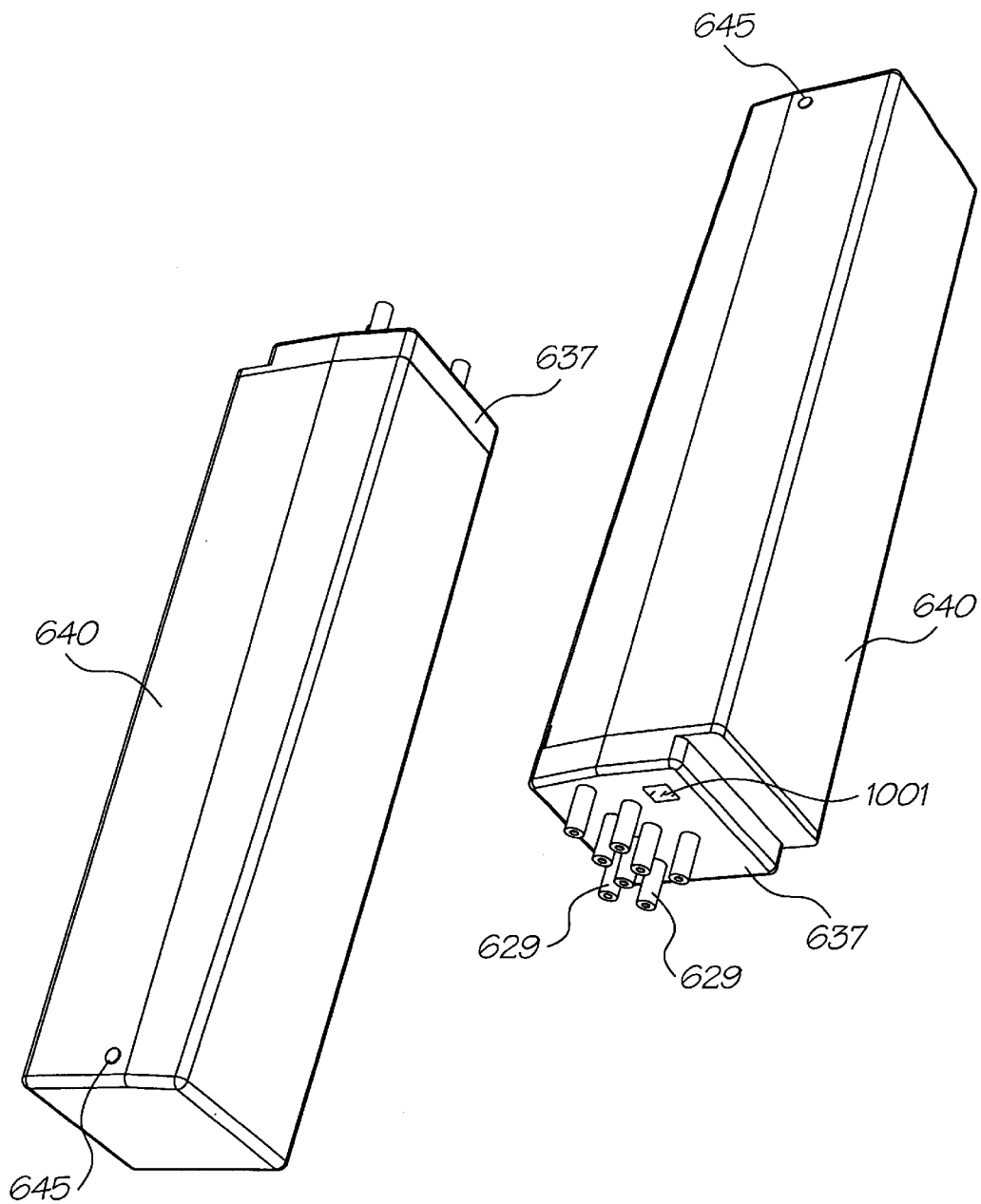
FIGS. 6a and 6b show three quarter views of the ink cartridge.

The wallprinter consists of a main chassis 606, which accommodates all major components and assemblies. As best shown in FIG. 5, it has a pivoting media tray 607 on the front upper portion, which is covered by a front molding 608 and handle molding 609. The front molding 608, handle molding 609 and lower front molding 610 can vary in color, texture and finish to make the product more appalling to consumers. They simply clip onto the front of the wallprinter 601.

Figure 4:
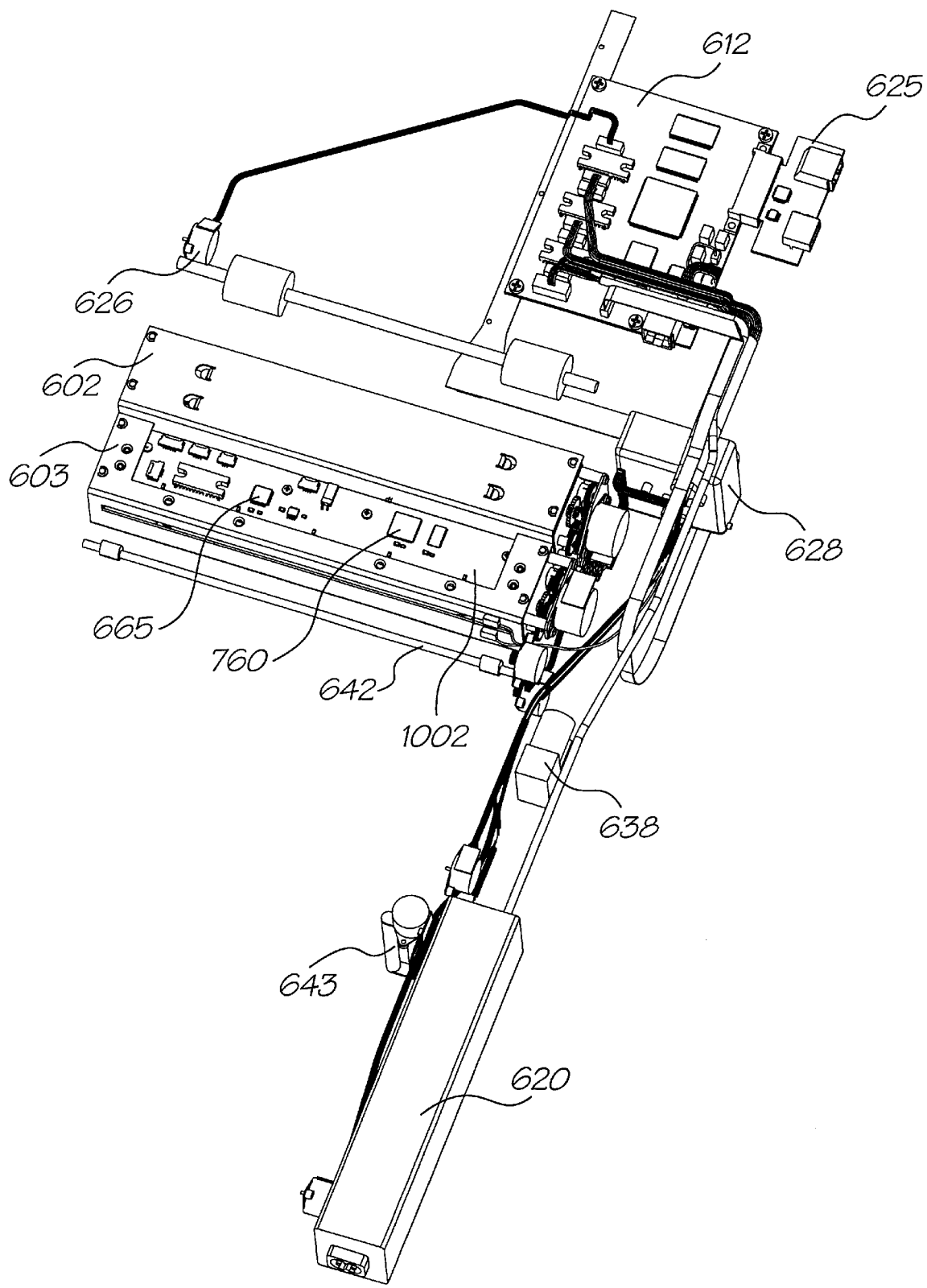
FIG. 4 shows a front three-quarter view of the electrical system of the printer.

FIG. 4 shows the wallprinter electrical system in isolation. A flexible printed circuit board (flex PCB) 11 runs from the media tray 607 to the main PCB 612. It includes four different color LEDs 613, 614, 615 and 616 and a push button 617. The LEDs show through the front molding and indicate "on" 613, "ink out" 614, "paper out" 615, and "error" 616. The push button 617 elicits printed "help" in the form of usage instructions, printer and consumable status information, and a directory of resources on the netpage network.

The wallprinter 601 is powered by an internal 110V/220V power supply 620 and has a metal mounting plate 621 that is secured to a wall or stable vertical surface by four screws. Plunged keyhole slot details 622 in the metal plate 621 allow for four spigots mounted on the rear of the printer to hook onto the plate. As best shown in FIGS. 2 and 19, the wallprinter 601 is prevented from being lifted off by a screw, which locates the chassis molding 606 to the plate 621 at one position behind the media tray 607.

The side of the wallprinter 601 includes a module bay 624 which accommodates a network interface module 625 which allows the printer to be connected to the netpage network and to a local computer or network. The interface module 625 can be selected and installed in the factory or in the field to provide the interfaces required by the user. A range of interface modules are available, each containing a netpage network interface and optionally a local computer or network interface.

The main PCB 612 is attached to the rear of the chassis 606. The board 612 interfaces through the chassis molding 606 to the interface module 625. The PCB also carries the necessary peripheral electronics to the Memjet™ printheads. This includes a main CPU with two 32 MB DRAMs, flash memory, EEE 1394 interface chip, six motor controllers, various sensor connectors, interface module PCB edge connector, power management, internal/external data connectors and a QA chip.

Figure 3:
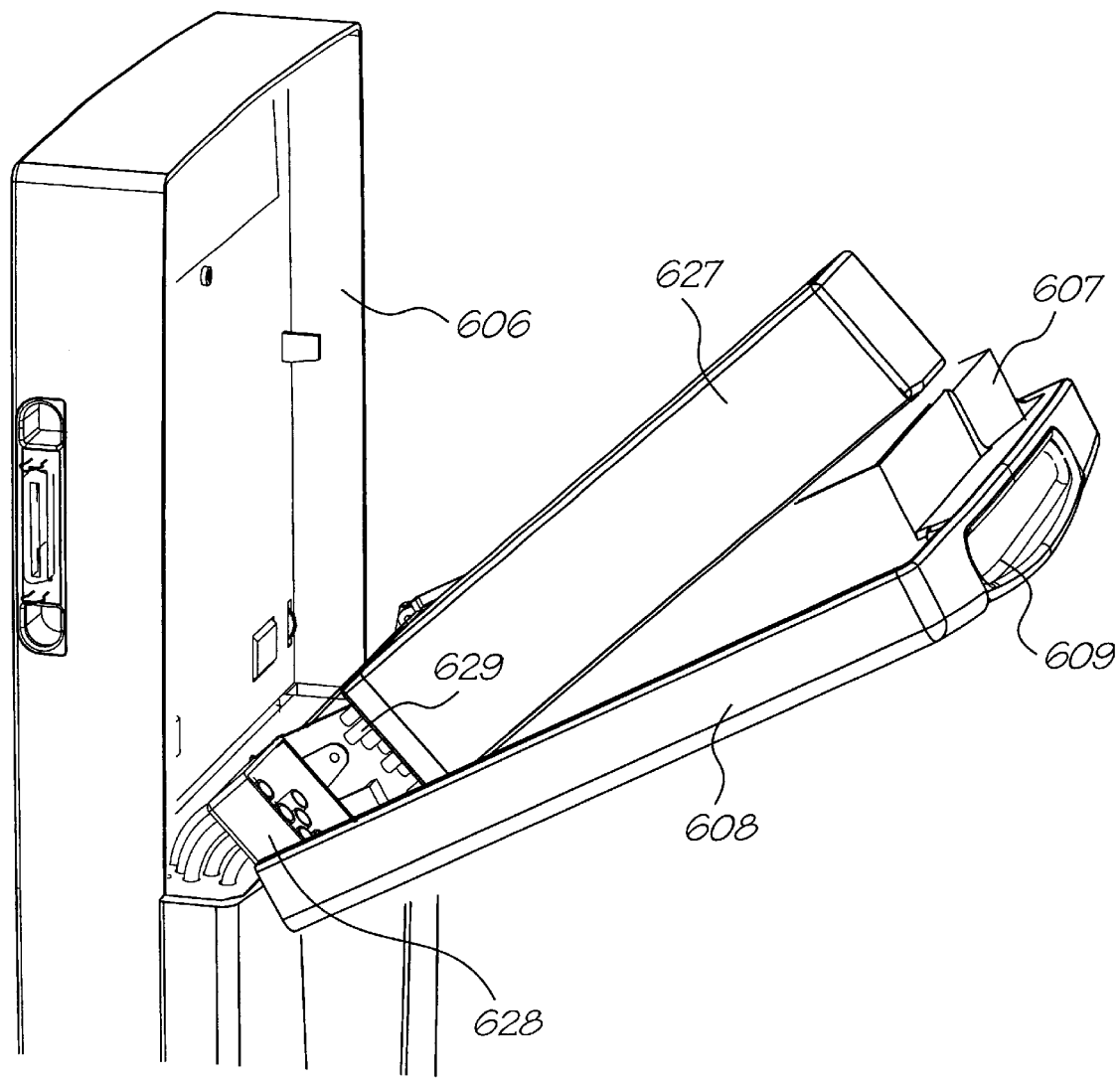
FIG. 3 shows a front three-quarter view of the open media tray.
Figure 7:
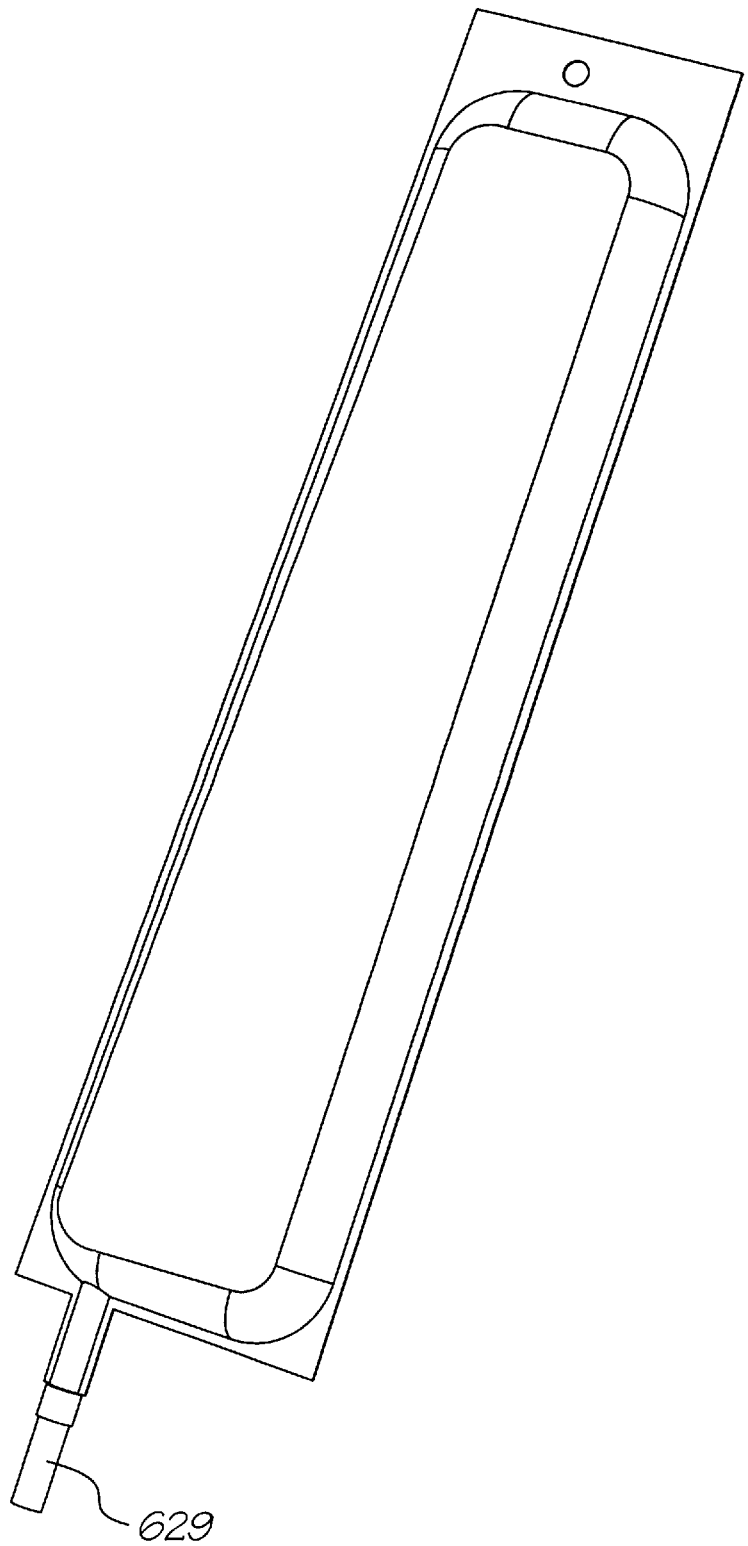
FIG. 7 shows a three quarter view of a single ink bladder.
Figure 8:
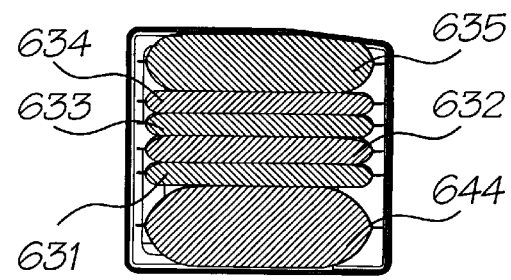
FIG. 8a is a lateral section through the ink cartridge.
FIG. 8b is a longitudinal section through the ink cartridge.
Figure 8A:
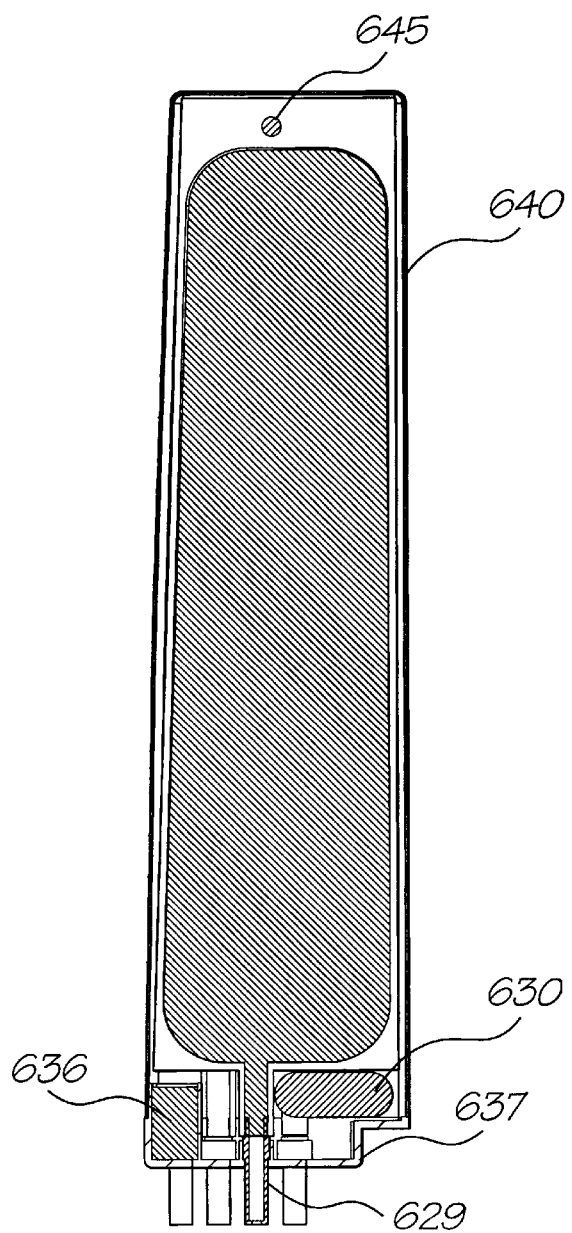

Referring to FIG. 3, paper is placed into a hinged media tray 607 and pressed down onto a sprung platen (not shown). When the front cover 608 is sensed closed, a release mechanism allows the sprung platen to push the paper 604 against a motorized media pick-up roller 626 shown in FIG. 7.

Figure 10:
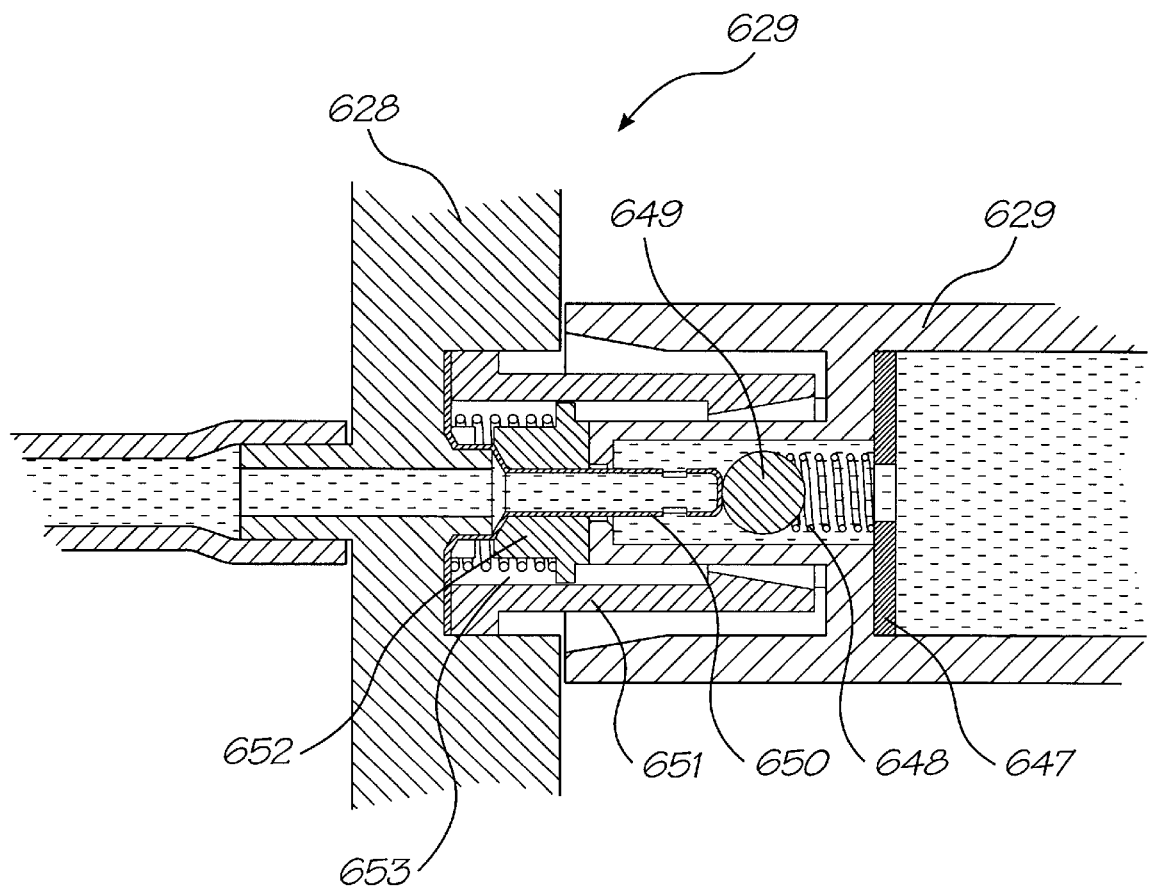
FIG. 10 shows an enlarged section through the ink outlet nozzle of a bladder.

An ink cartridge 627 connects into a pivoting ink connector molding 628 via a series of self-sealing connectors 629, which transmit ink, air and glue to their separate locations. A detailed section of the connectors 629 is shown in FIG. 10. This ink connector molding 628 contains an electrical connector (not shown) which connects with a QA chip 1001 on the ink cartridge 627. The cartridge QA chip 1001 interfaces with a QA chip 665 located on circuit board 1002 of the print engine 603 via a master print engine controller 760. The QA chip 1001 allows ink usage to be recorded, in order to avoid exhausting the ink supply and consequently damaging the Memjet™ print-heads. It can also be used to prevent the use of non-netpage cartridges. This helps to control the printers' operating conditions by ensuring that the printheads are only provided with suitable consumables.

FIGS. 5, 6*a*, 6*b*, 7, 8*a* and 8*b* show the complete assembly of the replaceable ink cartridge 627. The cartridge 627 is housed within a thin wall casing 640. It has bladders or chambers for storing fixative 644, adhesive 630, and cyan 631, magenta 632, yellow 633, black 634 and infrared 635 inks. The ink bladders 631 to 635 and fixitive bladder 644 are suspended within the casing by a pin 645 which hooks the cartridge together. A single glue bladder 630 is accommodated in the base molding 637. This is a fully recyclable product with a capacity for printing and gluing 3000 pages (1500 sheets).

Figure 9:
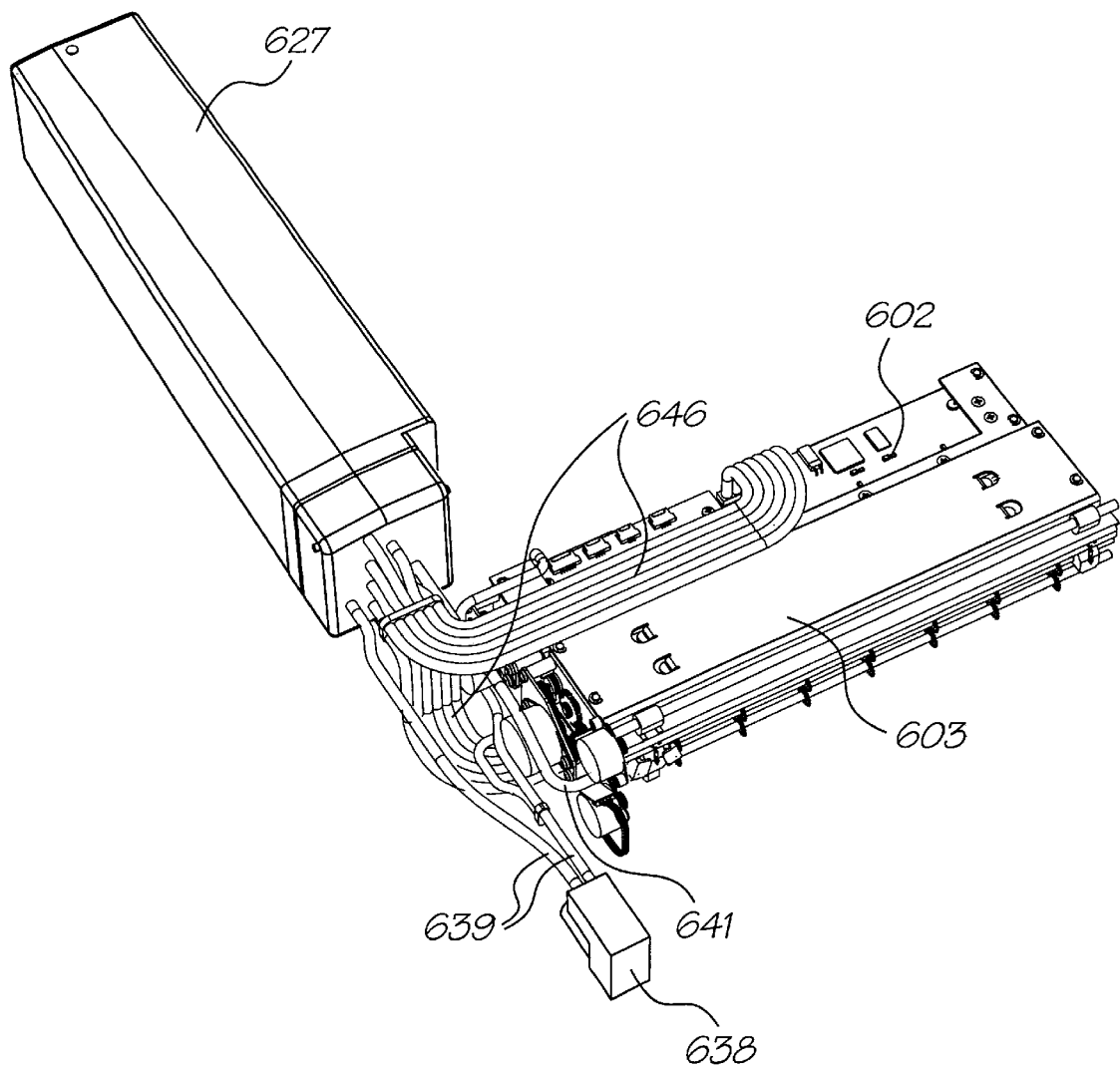
FIG. 9 shows the ink, air and adhesive supply hoses to the print engines.

The cartridge 627 also contains a micro air filter 636 in a base molding 637. As shown in FIG. 9, the micro air filter 636 interfaces with an air pump 638 inside the printer via a hose 639. This provides filtered air to the printheads to prevent ingress of micro particles into the Memjet™ printheads which may clog the nozzles. By incorporating the air filter 636 within the cartridge 627, the operational life of the filter is effectively linked to the life of the cartridge. This ensures that the filter is replaced together with the cartridge rather than relying on the user to clean or replace the filter at the required intervals. By enforcing the regular replacement of the air filter 636 in this way, the operating conditions of the printheads can be better controlled. Obviously, this in turn benefits the printhead reliability and operational life of the printhead.

The invention has been described herein by way of example only. Workers in this field will readily recognise many variations and modifications which do not depart from the spirit and scope of the broad inventive concept.

What is claimed is:

1. A replaceable cartridge for an ink jet printer, the printer including a printhead which, in use, receives air, and a binder which, in use, binds printed pages into a bound document using a binding material, the replaceable cartridge including:

a storage chamber for the binding material, and an air filter unit, whereby, in use, air received by the printhead is filtered by the air filter unit.

2. A replaceable cartridge according to claim 1 wherein, in use, the air filter unit removes microscopic particles from the air received by the printhead.

3. A replaceable cartridge according to claim 1 wherein, the air filter unit is adapted to detachably interface with a conduit system of the printer.

4. A replaceable cartridge according to claim 1 further adapted to supply the printer with cyan, magenta, yellow ink.

5. A replaceable cartridge according to claim 1 further adapted to supply the printer with black ink.

6. A replaceable cartridge according to claim 1 further adapted to supply the printer with infrared ink.

7. A replaceable cartridge according to claim 1 further adapted to supply the printer with fixative.

8. A replaceable cartridge according to claim 1 further including an authentication device which, in use, communicates with a microprocessor of the printer, and normal operation of the printer only occurs if the authentication device provides an expected response to a query from the microprocessor.

* * * * *